(12) United States Patent
Jain et al.

(10) Patent No.: US 11,016,794 B2
(45) Date of Patent: May 25, 2021

(54) PERIPHERAL DEVICE ACCESS SUPPORT FOR CONTAINERS

(71) Applicant: VMware, Inc., Palo Alto, CA (US)

(72) Inventors: Punit Kumar Jain, Bangalore (IN); Madhusudhanan Gangadharan, Bangalore (IN); Kashyap Guruprakash Subramanya, Bangalore (IN); Hariharan Jeyaraman Ganesan, Bangalore (IN); Rajesh Petchimuthu, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 7 days.

(21) Appl. No.: 16/206,147

(22) Filed: Nov. 30, 2018

(65) Prior Publication Data

US 2020/0174813 A1   Jun. 4, 2020

(51) Int. Cl.
*G06F 9/455* (2018.01)
*G06F 13/10* (2006.01)
*G06F 9/48* (2006.01)

(52) U.S. Cl.
CPC ........ *G06F 9/45558* (2013.01); *G06F 9/4868* (2013.01); *G06F 13/10* (2013.01); *G06F 2009/4557* (2013.01); *G06F 2009/45579* (2013.01); *G06F 2009/45595* (2013.01)

(58) Field of Classification Search
CPC .................................................. G06F 9/45558
See application file for complete search history.

(56) References Cited

U.S. PATENT DOCUMENTS

| | | | | |
|---|---|---|---|---|
| 2010/0058341 | A1* | 3/2010 | Jung | H04L 67/08 718/1 |
| 2010/0146506 | A1* | 6/2010 | Lee | G06F 9/455 718/1 |
| 2017/0366405 | A1* | 12/2017 | Ganesan | G06F 9/45558 |
| 2018/0060104 | A1* | 3/2018 | Tarasuk-Levin | G06F 9/5077 |

* cited by examiner

*Primary Examiner* — Sisley N Kim
(74) *Attorney, Agent, or Firm* — Thomas | Horstemeyer LLP

(57) ABSTRACT

Peripheral device access support in a distributed computing resource cluster is described. In one example, an application can be supported in a container on a virtual machine in a distributed computing resource cluster. A need or requisite of the container for access to a peripheral device is identified. A device profile is created for the container and associated with the isolation environment. The device profile can be relied upon to check and confirm the compliance of one or peripheral devices on various host machines in the resource cluster. First, one or more host machines having access to the peripheral device are identified in the resource cluster. Then, a check for compliance of the peripheral device on one or more of the host machines is performed based on the device profile. The container is instantiated for the application on one of the host machines based on the check for compliance.

20 Claims, 6 Drawing Sheets

| Virtual Device ID | Device Name | Attached Host | Connection Type | Device Speed | In Use? | Remotely Accessible? | Network Access Speed | Available Network Bandwidth | Typical Access Duration | Utilized % of Time | Authentication Required? |
|---|---|---|---|---|---|---|---|---|---|---|---|
| 1 | LTO | H1 | IDE | 2 GBps | No | No | XX | 100 MBps | 1 min | 90% | Yes |
| 2 | USB 3.0 | H2 | USB | 3 GBps | Yes | No | 1 GBps | 200 MBps | 10 min | 30% | No |
| 3 | Scanner | H3 | IDE | 100 MBps | Yes | Yes | 1 GBps | 100 MBps | 3 min | 15% | Yes |
| 4 | Printer | H3 | LPT1 | 10 MBps | No | Yes | 1 GBps | 10 MBps | 5 min | 5% | No |
| 5 | BC Reader | H2 | USB | 1 MBps | No | No | XX | 1 MBps | 1 min | 3% | No |
| 6 | --- | --- | --- | --- | --- | --- | --- | --- | --- | --- | --- |
| 7 | --- | --- | --- | --- | --- | --- | --- | --- | --- | --- | --- |
| 8 | --- | --- | --- | --- | --- | --- | --- | --- | --- | --- | --- |

| Virtual Device ID | Physical Device Address / ID | Device Name | Attached Host | Subscribers | Device State Map |
|---|---|---|---|---|---|
| 1 | #---- | LTO | H1 | Xa, Xs, Xq | # --x-xx--xx-xx-x |
| 2 | #---- | USB 3.0 | H2 | Xb, Xc, Xq | # --x--x--xx--xx |
| 3 | #---- | Scanner | H3 | Xc | # xxx--x--xx--xx |
| 4 | #---- | Printer | H3 | Xa, Xb, Xc, Xq | # --x--x--xx--xx |
| 5 | #---- | BC Reader | H2 | Xa, Xc, Xq | # --x--xxxxx--xx |
| 6 | --- | --- | --- | --- | --- |
| 7 | --- | --- | --- | --- | --- |
| 8 | --- | --- | --- | --- | --- |

| Device | Required? | Speed Requirements | Remote Access Permitted? | Typical Access Duration and Frequency | Device State Map |
|---|---|---|---|---|---|
| LTO | No | --- | | | |
| USB 3.0 | Yes | 10 Mbps | No | 30 Sec. / Hour | # --x-xx--xx-xx-x |
| Scanner | No | --- | | | |
| Printer | Yes | 1 MBs | Yes | 20 Sec. / Day | # --x-xx--xx-xx-x |
| BC Reader | No | --- | | | |

*FIG. 2C*

PERIPHERAL DEVICE ACCESS SUPPORT FOR CONTAINERS

CROSS-REFERENCE TO RELATED APPLICATIONS

This application is related to U.S. patent application Ser. No. 15/291,090, titled "Accessing Peripheral Devices from a Container within Virtual Machines Running on Different Host Computing Systems," filed on Oct. 12, 2016, the complete disclosure of which is hereby fully incorporated herein by reference.

BACKGROUND

As host hardware platforms have grown larger, with greater processor core counts and available memory, virtualization has become important for the efficient and effective use of computing resources. Virtualization is directed to the creation of virtual (rather than physical or actual) instances of computing resources, such as processors, memories, storage devices, network interfaces, and peripheral devices, among others. Virtualization can result in the creation of isolated environments for the execution of applications under the control of virtualization software on one or more host hardware platforms. A host hardware platform on which a hypervisor or container manager runs can be called a host machine.

A hypervisor can include one or more virtual machine monitors (VMMs) to provide monitoring services for the isolated environments for the execution of applications. A VMM can be a combination of computer software, firmware, and hardware that supports the execution of guest operating systems and/or the applications executing in the isolated environments. Thus, the hypervisor presents guest operating systems with a virtual operating platform and manages the execution of guest operating systems and related applications.

Containerization is another virtualization technique that relies on isolated containers executing on a virtual machine or directly on a host machine. In containerization, an abstraction layer is configured using the kernel of an operating system executing on the virtual or host machine. A container relies on the functionality of the kernel in order to run applications, with certain resource constraints (e.g., memory, processing time, or other constraints) and isolation from other applications.

Host hardware platforms on which virtual machines and containers execute can operate with peripheral devices. Peripheral devices can include input devices (e.g., keyboards, pointing devices, tablets, touch screens, image scanners, microphones, cameras, barcode readers, and other input devices), output devices (e.g., display devices, printers, speakers, and other output devices), storage devices (e.g., external hard drives, linear tape-open (LTO) drives, flash drive/solid-state drives, CD- and DVD-ROM drives, and other storage devices), network interface devices (e.g., modems, network interface controllers, and other network interface devices), among other peripheral devices. Each peripheral device requires host computing system resources, such as processor time, input/output bandwidth on various data buses, and physical memory space.

In many cases, when a peripheral device is attached to a host computing system, the peripheral device is not available to virtual machines configured to run on other host computing systems, even if the host computing systems are on the same cluster of computing systems interconnected with each other over a computer network. Similarly, the peripheral device may not be available to containers configured to run on host computing systems other than that to which the peripheral device is attached.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

FIG. 2A illustrates an example device catalogue for the distributed computing resource cluster in the networked environment shown in FIG. 1 according to various examples described herein.

FIG. 2B illustrates an example device management profile for the distributed computing resource cluster in the networked environment shown in FIG. 1 according to various examples described herein.

FIG. 2C illustrates an example device profile for one of the containers in the networked environment shown in FIG. 1 according to various examples described herein.

DETAILED DESCRIPTION

Figure 1:
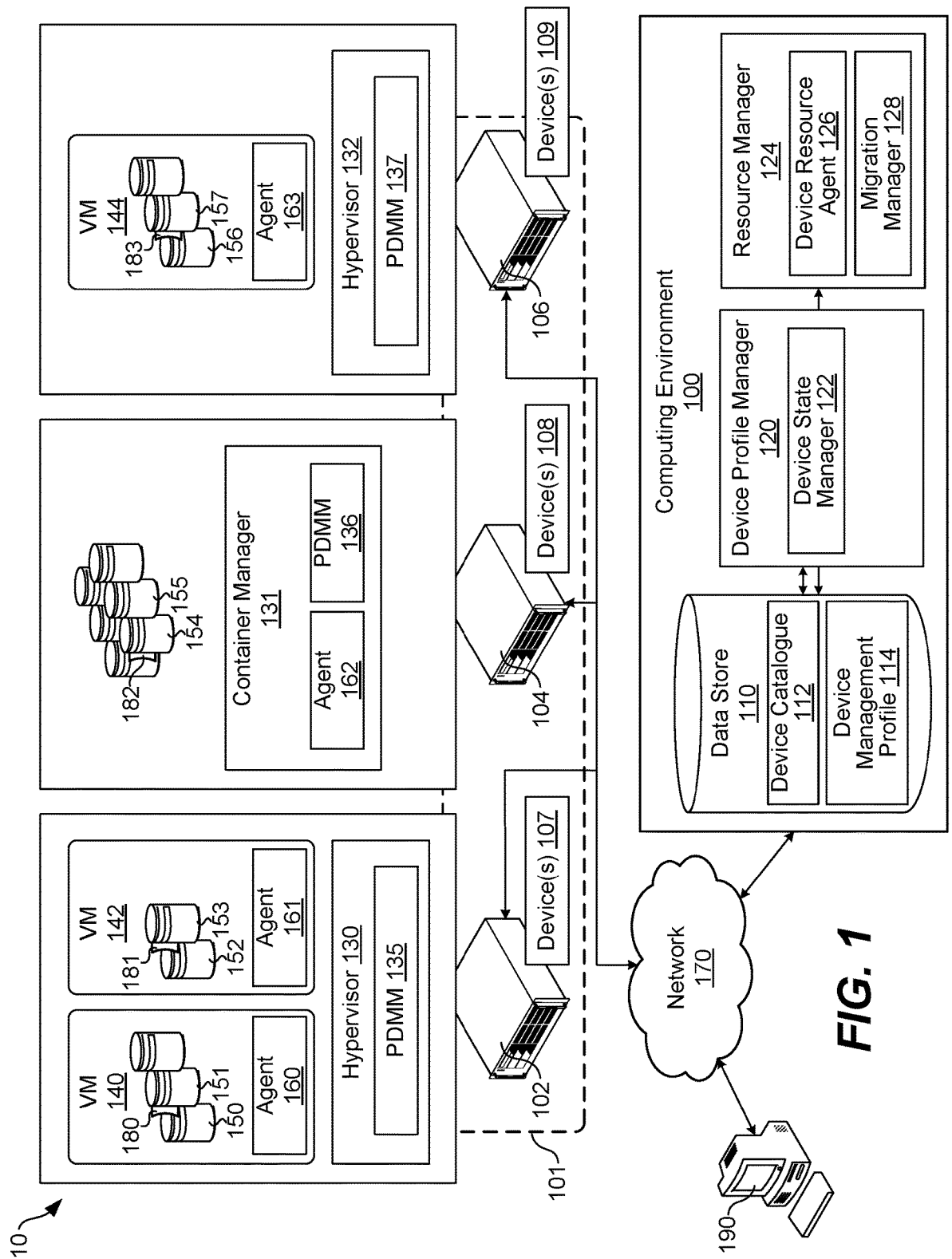
FIG. 1 illustrates an example networked environment for peripheral device access support for containers according to various examples described herein.

As noted above, virtualization is directed to the creation of virtual instances of computing resources, such as processors, memories, storage devices, and network interfaces, among computing resources. Virtualization can be relied upon to create isolated environments for the execution of applications under the control of virtualization software on one or more host hardware platforms.

A hypervisor can be relied upon to manage one or more virtual machines (VMs) on a host or in a distributed computing resource cluster of multiple hosts through the virtual replication of hardware. A VM is one example of an isolated environment for the execution of an operating system and various applications. Similar to a VM, a container is an example of an isolated environment and is typically relied upon for the execution of applications. A container manager can be relied upon to simplify how an administrator adds or replaces containers on a host machine or in a distributed computing resource cluster. Thus, a container manager can automate the creation, destruction, and deployment of a large number of containers.

Both VMs and containers provide isolated environments for the execution of software. A number of containers can rely upon the same underlying operating system to provide basic services to all containerized applications using virtual-memory support for isolation. VMs, on the other hand, typically execute separate, isolated operating systems using hardware VM support. Overall, containers require less processing and memory overhead than VMs, and containers are typically relied upon in computing environments where thousands of containers are needed. Both VMs and containers can be instantiated and hosted on various host computing machines in a distributed computing resource cluster. In some cases, it may be necessary to migrate VMs and containers between different host computing machines in the cluster.

A number of peripheral devices, such as disk, solid state, and tape drives, scanners, printers, bar code readers, cameras, displays, input devices, and other devices can be directly connected to serial, parallel, and other ports and interfaces of host computing machines in the cluster. In that case, access to the peripheral devices can be limited to only certain VMs and containers hosted on the cluster. For example, a bar code reader connected to a serial port of one host computing machine may be available for access to only the VMs and containers hosted on that one host computing machine and not to VMs and containers hosted on other host computing machines in the same cluster. Access to peripheral devices is thus a concern and should be accounted for when instantiating new VMs and containers and also when migrating VMs and containers.

In the context outlined above, peripheral device access support in a distributed computing resource cluster is described herein. In one example, an application can be supported in a container on a virtual machine in a distributed computing resource cluster. A need or requisite of the application for access to a peripheral device can be identified. In various scenarios, the need for access to a peripheral device can be identified before the container is instantiated, after the container is instantiated, and either before or after one or more applications in the container begin executing. For an application currently executing in a container on a host machine, the need for access to the peripheral device can also be balanced against the available resources on the host machine. For example, although a first host machine can provide access to the peripheral device, a container can be migrated to a second host machine which provides access to the same or a different peripheral device if the resources on the first host machine are constrained.

To achieve peripheral device access support, a device profile is created for and associated with an isolation environment, such as a virtual machine (VM) or container, in which an application is hosted. The device profile can be relied upon to check whether or not one or more peripheral devices on certain host machines in the resource cluster are compliant for the access needs of the application hosted in the isolation environment. After the device profile is established, one or more host computing machines having access to the peripheral device are identified in the resource cluster. Then, a check for compliance of the peripheral device on the host computing machines is performed based on the device profile. The check for compliance can include comparing the device profile for the isolation environment with a device management profile for the resource cluster.

If the check for compliance passes, the container can be instantiated for the application on one of the host computing machines having access to the peripheral device. The container can be instantiated for the first time on one of the host computing machines. Alternatively, the container can be migrated, possibly with a virtual machine, from a first host computing machine to a second host computing machine. When migrating a container between host computing machines in the resource cluster, a device state of the peripheral device can be stored at the first host machine and any execution of the application on the container can be halted. After the container is migrated from the first to the second host computing machine, the device state for the peripheral device can be replicated on the second host computing machine. The state of the device can then be checked for consistency and compliance on the second host computing machine before the execution of the application is resumed. In certain cases, a device profile of a container can be marked as being non-compliant against one or more host computing machines in the resource cluster to avoid instantiation or migration of containers to incompatible host computing machines.

Turning to the drawings, the following paragraphs provide an outline of a networked environment followed by a discussion of the operation of the same. FIG. 1 illustrates an example networked environment for peripheral device access support for containers according to various examples described herein. The networked environment 10 includes a computing environment 100, a distributed computing resource cluster 101 ("cluster 101") of host computing machines 102, 104, and 106, among others, and a client device 190 in communication with each other over the network 170. The networked environment 10 is provided as a representative example for purposes of discussion and can include other components not illustrated in FIG. 1. Similarly, the host computing machines 102, 104, and 106 are example host machines in the distributed computing resource cluster 101, but any number of host machines can be relied upon to form the cluster 101. A number of isolation environments, such as VMs and containers, are hosted on the host computing machines 102, 104, and 106 in the cluster 101 as described in further detail below. Further, a number of peripheral devices 107-109, respectively, are connected to the host computing machines 102, 104, and 106.

The computing environment 100 can be embodied as one or more computers, computing devices, or computing systems. In certain embodiments, the computing environment 100 can include one or more computing devices arranged, for example, in one or more server or computer banks. The computing device or devices can be located at a single installation site or distributed among different geographic locations. The computing environment 100 can include a plurality of computing devices that together embody a hosted computing resource, a grid computing resource, or other distributed computing arrangement. In some cases, the computing environment 100 can be embodied, in part, by one or more of the host computing machines 102, 104, and 106. As further described below, the computing environment 100 can also be embodied, in part, as certain functional or logical (e.g., computer-readable instruction) elements or modules.

The computing environment 100 can function as a device profile and resource manager for the cluster 101. As shown in FIG. 1, the computing environment 100 includes the data store 110, the device profile manager 120, and the resource manager 124. The data store 110 includes memory areas to store peripheral device data and management profiles associated with peripheral access support in the cluster 101, including a memory area for a device catalogue 112 and a memory area for the device management profile 114, both of which are described in further detail below. The device profile manager 120 includes a device state manager 122, and the resource manager 124 includes a device resource agent 126 and a migration manager 128, both of which are also described below.

The host computing machines 102, 104, and 106 can be embodied as one or more computers, computing devices, or computing systems similar to the computing environment 100. As shown in FIG. 1, the host computing machine 102 hosts the VM 140 and the VM 142 at the direction of the hypervisor 130, which includes a peripheral device management module (PDMM) 135. The VM 140 hosts the containers 150 and 151, among others, in which one or more applications can execute in isolated environments. The VM 142 hosts the containers 152 and 153, among others, in which one or more applications can execute in isolated environments.

Among other applications executing on the VM 140, the VM 140 includes an access agent 160. Similarly, the VM 142 includes an access agent 161. The access agents 160 and 161 are configured to identify the need for use of peripheral devices by the applications executing in the containers 150-153. For example, the applications executing in the containers 150-153 can require access to the peripheral devices 107 connected to the host computing machine 102. The peripheral devices 107 can include disk, solid state, and tape drives, scanners, printers, bar code readers, cameras, displays, input devices, and other devices. The peripheral devices 107 can be connected to Universal Serial Bus (USB), serial bus, parallel bus, and other ports and interfaces of the host computing machine 102. In some cases, the peripheral devices 107 can be USB buses, serial buses, parallel buses, and other interfaces of the host computing machine 102.

To track the need for access to the peripheral devices 107, the access agent 160 can create a device profile 180 for the container 151 and associate the device profile 180 with the container 151. The access agent 160 can also create other device profiles for the other containers hosted on the VM 140, including the container 150, if necessary. The device profile 180 can include certain information related to what peripheral devices are needed by the application executing (or to be executed) in the container 151. Similarly, the access agent 161 can create a device profile 181 for the container 153 and associate the device profile 181 with the container 153. An example device profile similar to the device profiles 180 and 181 is described in further detail below with reference to FIG. 2C.

The access agents 160 and 161 can also monitor the use of the peripheral devices 107 by the applications executing in the containers 150-153. The access agents 160 and 161 can monitor the device state, device access speed and bandwidth, device access frequency and duration, and other access-related data associated with the peripheral devices 107.

The PDMM 135 of the hypervisor 130 is configured to survey for and monitor the operational states of the peripheral devices 107 connected to the host computing machine 102. The PDMM 135 can recognize when the peripheral devices 107 are connected to the host computing machine 102 and communicate data related to the peripheral devices 107 back to the device profile manager 120 of the computing environment 100. In turn, the device profile manager 120 can compile the data related to the peripheral devices 107, along with data related to the peripheral devices 108 and 109 connected to the host computing machines 104 and 106, and store that data as the device catalogue 112 in the data store 110.

The PDMM 135 is also configured to gather information on the need for and use of the peripheral devices 107 by the applications in the containers 150-153, among others, hosted by the VMs 140 and 142. For example, the PDMM 135 can gather the peripheral-device-requirement data contained in the device profile 180, including the peripheral device access needs, device state requirements, device speed requirements, device access frequency and duration requirements, and other device access needs of the application in the container 151. The PDMM 135 can also gather the access-related data gathered by the access agents 160 and 161, such as device state, device access speed and bandwidth, device access frequency and duration, and other access-related data associated with the peripheral devices 107. The PDMM 135 can consolidate the peripheral-device-requirement and access-related data and forward it to the device profile manager 120 and the resource manager 124 for review and processing as described in further detail below.

In some cases, one or more of the applications executing in the containers 150-153 may have a need or requirement for access to peripheral devices other than the peripheral devices 107 connected to the host computing machine 102. For example, the applications executing in the containers 150-153 may need access to the peripheral devices 108 or 109 connected to the host computing machines 104 or 106, among others, in the cluster 101. According to the concepts of peripheral device access support described herein, the resource manager 124 can facilitate peripheral device access support for any applications hosted on the cluster 101 in various ways. The resource manager 124 can interface with the device profile manager 120 to determine which of the host computing machines 102, 104, and 106 provide access to the peripheral devices 107-109, as needed, based on the access-related needs of certain applications executing in the containers 150-157. The resource manager 124 can also instantiate new containers and migrate VMs and containers between the host computing machines 102, 104, and 106 based on the access-related needs. The resource manager 124 can also interface with the device profile manager 120 to provision access to the peripheral devices 107-109 among two or more of the host computing machines 102, 104, and 106 through the network 170. The peripheral device access operations of the resource manager 124 and the device profile manager 120 are described in further detail below.

Similar to the host computing machine 102, the host computing machine 104 hosts the containers 154 and 155 at the direction of the container manager 131, which includes the access agent 162 and the PDMM 136. The containers 154 and 155 are not instantiated within a VM in the host computing machine 104. Instead, the containers 154 and 155 rely upon an operating system executing directly on the host computing machine 104 to provide basic services, such as virtual-memory support for isolation. The container manager 131 includes the access agent 162 to monitor and facilitate the need for and use of the peripheral devices 108 by the applications executing in the containers 154 and 155. To that end, the access agent 162 can create a device profile 182 for the container 153, among others, and associate the device profile 182 with the container 154. An example device profile similar to the device profile 182 is described in further detail below with reference to FIG. 2C.

Similar to the PDMM 135, the PDMM 136 of the container manager 131 is configured to gather peripheral-device-requirement and access-related data associated with the applications in the containers 154 and 155. For example, the PDMM 136 can gather data in the device profile 182 and data from the access agent 162. The PDMM 136 can consolidate the peripheral-device-requirement and access-related data and forward it to the device profile manager 120 and the resource manager 124 for further analysis and processing.

The host computing machine 106 hosts the VM 144, among others, at the direction of the hypervisor 134, which includes a PDMM 137. The VM 144 hosts a number of containers, including the containers 156 and 157. Among other applications executing on the VM 144, the VM 140 includes an access agent 163. The access agent 163 is configured to monitor and facilitate the need for and use of peripheral devices by the applications executing in the containers 156 and 157. To that end, the access agent 163 can create a device profile 183 for the container 157, among others, and associate the device profile 183 with the container 157. An example device profile similar to the device profile 183 is described in further detail below with reference to FIG. 2C. The PDMM 137 performs peripheral-device-requirement and access-related data monitoring and collection for the applications in the containers 156 and 157, similar to that performed by the PDMMs 135 and 136. The PDMM 137 can consolidate the peripheral-device-requirement and access-related data and forward it to the device profile manager 120 and the resource manager 124 for further analysis and processing.

The network 170 can include the Internet, intranets, extranets, wide area networks (WANs), local area networks (LANs), wired networks, wireless networks, cable networks, satellite networks, other suitable networks, or any combinations thereof. As one example, the computing environment 100, the client device 190, and the host computing machines 102, 104, and 106 in the cluster 101 can be coupled to LANs, WANs, and the Internet for network-based data communication among each other. Although not shown in FIG. 1, the network 170 can also include network connections to any number and type of network hosts or devices, such as website servers, file servers, cloud computing resources, databases, data stores, or any other network or computing architectures.

The client device 190 is representative of one or more client devices. The client device 190 can be embodied as any computing device, processing circuit, or processor based device or system, including those in the form of a desktop computer, a laptop computer, a tablet computer, a personal digital assistant, a cellular telephone, a wearable computing device, or a set-top box, among other example computing devices and systems. Depending upon its primary purpose or function, for example, the client device 190 can include various peripheral devices or components. The client device 190 can be relied upon by an administrator to review and update certain information in the device profiles 180-183, the device catalogue 112, and the device management profile 114, for example. The client device 190 can also be relied upon to interface with and control certain operations of the device profile manager 120 and the resource manager 124.

In the networked environment 10, the computing environment 100, the host computing machines 102, 104, and 106, and the client device 190 can communicate data among each other using one or more network transfer protocols or interconnect frameworks, such as hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), internet protocol (IP), transmission control protocol (TCP), other protocols and interconnect frameworks, and combinations thereof.

The resource manager 124 acts as a manager of the computing resources available among the host computing machines 102, 104, and 106. The resource manager 124 can manually or automatically scale the resources available, instantiate and shutdown VMs and containers, and migrate VMs and containers among the host computing machines 102, 104, and 106 in the cluster 101, among other operations. As one example, if the workload on one or more of the host computing machines 102, 104, and 106 changes significantly, the resource manager 124 can redistribute the VMs and containers among the host computing machines 102, 104, and 106, as necessary.

To facilitate peripheral device access in the cluster 101, the resource manager 124 can also make instantiation and migration decisions based, at least in part, on the needs of certain applications for access to peripheral devices. The resource manager 124 can refer to the device catalogue 112 and the device management profile 114 in the data store 110 to make resource allocation and migration decisions for peripheral device access support. Examples of the types of data stored in the device catalogue 112 and the device management profile 114 are described in further detail below with reference to FIGS. 2A and 2B, respectively.

FIG. 2A illustrates an example of the types of data stored in the device catalogue 112 in the data store 110. The device catalogue 112 shown in FIG. 2A is provided as a representative example of the types of data gathered and stored for the peripheral devices 107-109. FIG. 2A is not an exhaustive illustration of all the types of data that can be stored for the peripheral devices 107-109. Other types of data can be stored for the peripheral devices 107-109 in the device catalogue 112, and it is also not necessary that the device catalogue 112 include all the different types of data shown in FIG. 2A. The data can also be organized and indexed in any suitable way.

The device profile manager 120 can compile and organize the device catalogue 112 for the peripheral devices 107-109, among others, based on the peripheral device data received from the PDMMs 135-137 of the host computing machines 102, 104, and 106, among other sources. The device profile manager 120 can also update the device catalogue 112, as necessary, as new peripheral device data is received from the PDMMs 135-137. For example, the device profile manager 120 can add or remove entries for devices in the device catalogue 112 over time as peripheral devices are connected and disconnected from the host computing machines 102, 104, and 106. The device profile manager 120 can also update entries based on the current state and status of the peripheral devices listed in the device catalogue 112.

According to the example shown in FIG. 2A, the device catalogue 112 can include a virtual device identifier entry for each of the peripheral devices 107-109 in the cluster 101. The device catalogue 112 also includes device name, attached host, connection type, device speed, in use, remote accessibility, access speed, network bandwidth, access duration, percent of time utilized, and authentication requirement entries for each of the peripheral devices 107-109.

The attached host entry identifies the host computing device 102, 104, or 106 to which each of the peripheral devices 107-109 is connected in the cluster 101. The connection type entry identifies the interface through which each of the peripheral devices 107-109 is connected to the host computing devices 102, 104, and 106 in the cluster 101. The device speed entry identifies the operating speed of the peripheral devices 107-109. The in use entry identifies whether or not each of the peripheral devices 107-109 is currently being used by some process of an application. The remote accessibility entry identifies whether or not the peripheral devices 107-109 can be accessed among the host computing machines 102, 104, and 106 through the network 170. The network access speed entry identifies the speed of access through the network 170. The available network bandwidth entry identifies the bandwidth on the network 170 available for network access. The typical access duration entry identifies the typical period of time that the peripheral devices 107-109 are used or accessed. The percent of time utilized entry identifies the percentage of time that the peripheral devices 107-109 are used. The authentication requirement entry identifies whether or not authentication is required for access to the peripheral devices 107-109.

FIG. 2B illustrates an example of the types of data stored in the device management profile 114 in the data store 110. The device management profile 114 shown in FIG. 2B is provided as a representative example of the types of device state data that can be stored for the peripheral devices 107-109. As shown in the example, the device management profile 114 can include a virtual device identifier, a physical device address or identifier, a device name, a host, a list of subscribers, and a device state map for each of the peripheral devices 107-109. FIG. 2B is not an exhaustive illustration of all the types of device state data that can be stored for the peripheral devices 107-109. Other types of device state data can be stored for the peripheral devices 107-109 in the device management profile 114, and it is also not necessary that the device management profile 114 include all the different types of device state data shown in FIG. 2B. The data can also be organized and indexed in any suitable way.

The device profile manager 120 can compile and organize the device state data in the device management profile 114 for the peripheral devices 107-109 based on the access-related data received from the PDMMs 135-137, among other sources. The device state manager 122 of the device profile manager 120 can also update the device management profile 114, as necessary, as new access-related data is received from the PDMMs 135-137. For example, the device state manager 122 can add or remove entries for devices in the device management profile 114 over time as peripheral devices are used by various applications in containers on the host computing machines 102, 104, and 106. The device state manager 122 can also update entries based on the current operating condition, state, and status of the peripheral devices listed in device management profile 114.

According to the example shown in FIG. 2B, the device management profile 114 can include a virtual device identifier entry for one or more of peripheral devices 107-109 in the cluster 101. The device management profile 114 also includes physical device address/identifier (ID), device name, attached host, subscribers, and device state map entries for a number of the peripheral devices 107-109. The virtual device identifier, device name, and attached host entries in the device management profile 114 are similar to those in the device catalogue 112. The physical device address/ID entry identifies a device identifier, such as a media access control (MAC) address, physical host port address, or other addressing ID associated with the peripheral devices 107-109. The subscriber's entry can identify which application(s), container(s), VM(s), and host computing machine(s), or some combination thereof, subscribe to or use the peripheral devices 107-109. The device state map entry identifies the current operating condition, state, and status of the peripheral devices 107-109.

As noted above, the resource manager 124 can reference the device catalogue 112 and the device management profile 114 to facilitate peripheral device access in the cluster 101. For example, the device resource agent 126 of the resource manager 124 can compare the device profiles of the containers, such as the devices profiles 180-183 of the containers 151, 153, 154, and 157, with the device catalogue 112 and the device management profile 114 to determine which of the peripheral devices 107-109 are available to support the needs of the applications executing in the containers 151, 153, 154, and 157. Thus, the device resource agent 126 can reference the device catalogue 112 and the device management profile 114 to determine which of the host computing machines 102, 104, and 106 are capable of providing access to the peripheral devices 107-109, as needed, based on the access-related needs of certain applications executing in the containers 150-157. The device resource agent 126 can also assist the migration manager 128 to migrate VMs and containers between the host computing machines 102, 104, and 106, based on the access-related needs. The device resource agent 126 can also reference the device catalogue 112 and the device management profile 114 to provision access to the peripheral devices 107-109 among two or more of the host computing machines 102, 104, and 106 through the network 170.

FIG. 2C illustrates an example of the device profile 180 of the container 151. The device profile 180 shown in FIG. 2C is provided as an example of the types of data that can be stored to reflect the peripheral device access needs of containers. FIG. 2C is not an exhaustive illustration of all the types of data that can stored in a device profile. Other types of peripheral device and state data can be stored, and it is also not necessary that the device profile 180 include all the different types data shown in FIG. 2B. The data can also be organized and indexed in any suitable way.

The device profile 180 can be created by the access agent 160 or the PDMM 135 upon the identification that the application executing in the container 151 needs or requires access to one or more of the peripheral devices 107-109, among others. The device profile 180 can be attached to or associated with the container 151. The device profile 180 includes a listing of several different peripheral devices and identifies that access is needed to "USB 3.0" and "Printer" devices. The device profile 180 also identifies certain device speed requirements, remote access permissions, and typical access duration and frequency information related to those devices. In some cases, the device profile 180 can also include a device state map associated with the "USB 3.0" and "Printer" devices, among others, as shown in FIG. 2C. However, the device profile 180 can omit the device state map information shown in FIG. 2C. The device state map information can, alternatively, be maintained in the memory of the container 151 rather than in the device profile 180 itself. Additionally, not all of the entries or fields shown in the device profile 180 are applicable or relied upon in every case. For example, before the application executing in the container 151 has obtained access to the "USB 3.0" and "Printer" devices, the device state map entries for those devices can be omitted or include null or placeholder data. Once the application has obtained access to the devices, however, the device state map can be populated with data related to the current operating condition, state, and status of the "USB 3.0" and "Printer" devices.

After the device profile 180 is attached to the container 151, the device resource agent 126 can compare the device profile 180 with the device catalogue 112 and the device management profile 114 to determine which of the peripheral devices 107-109 are available to support the needs of the application executing in the container 151. The device resource agent 126 can identify that the "USB 3.0" device is attached to the "H2" host, corresponding to the host computing device 104, and that the "Printer" device is attached to the "H3" host, corresponding to the host computing device 106. The device resource agent 126 can also identify that both the device profile 180 and the device catalogue 112 indicate that remote access is permitted for the "Printer" device. Based on the comparison, the device resource agent 126 can instruct or suggest the migration manager 128 to migrate the container 151 to the host computing machine 104 for access to the "USB 3.0" device. Access to the "Printer" device can also be separately coordinated between the host computing machine 104 and the host computing machine 106 through the network 170.

Figure 3A:
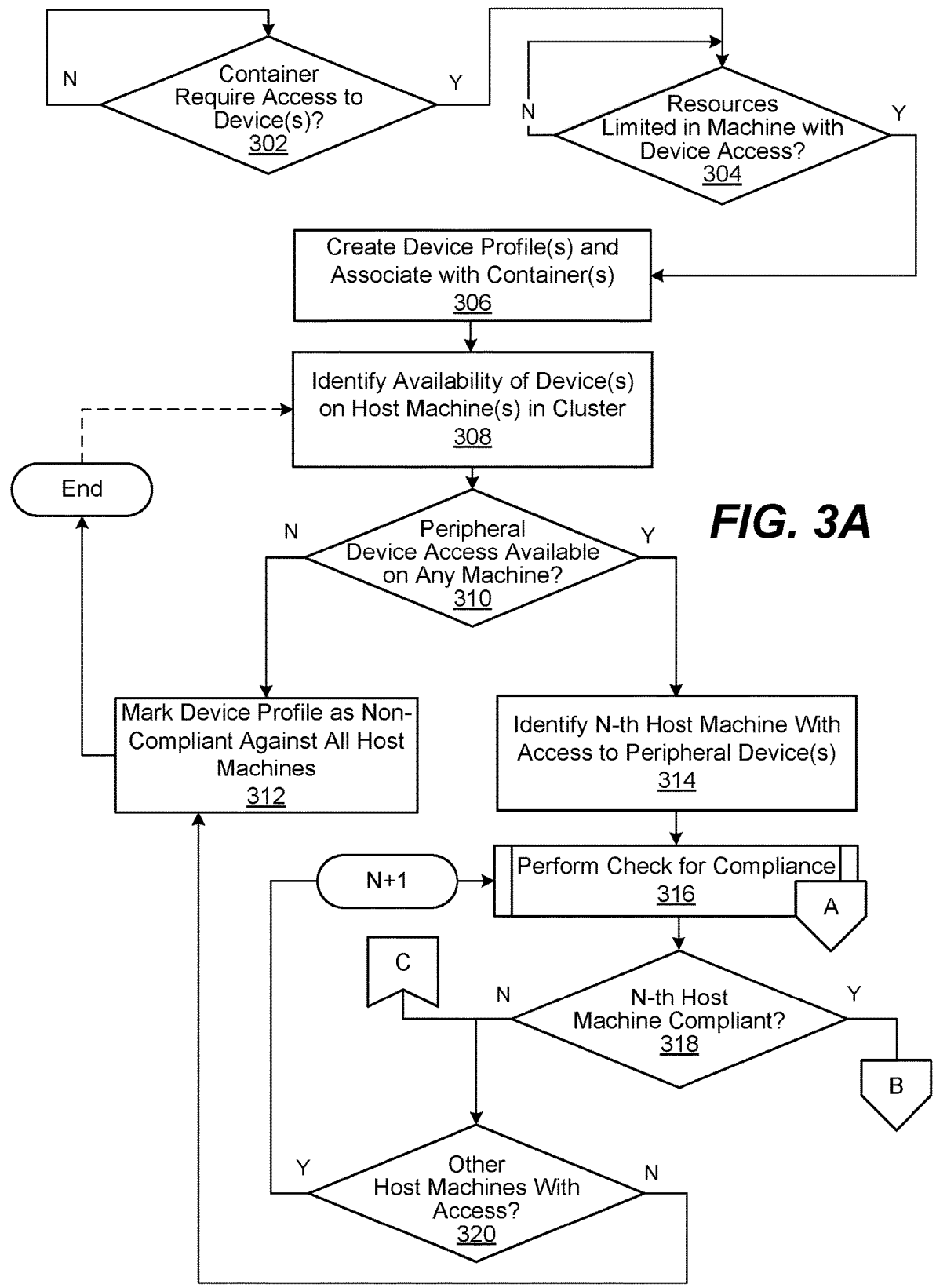
FIGS. 3A-3C illustrate a process for peripheral device access support for containers according to various examples described herein.
Figure 3B:
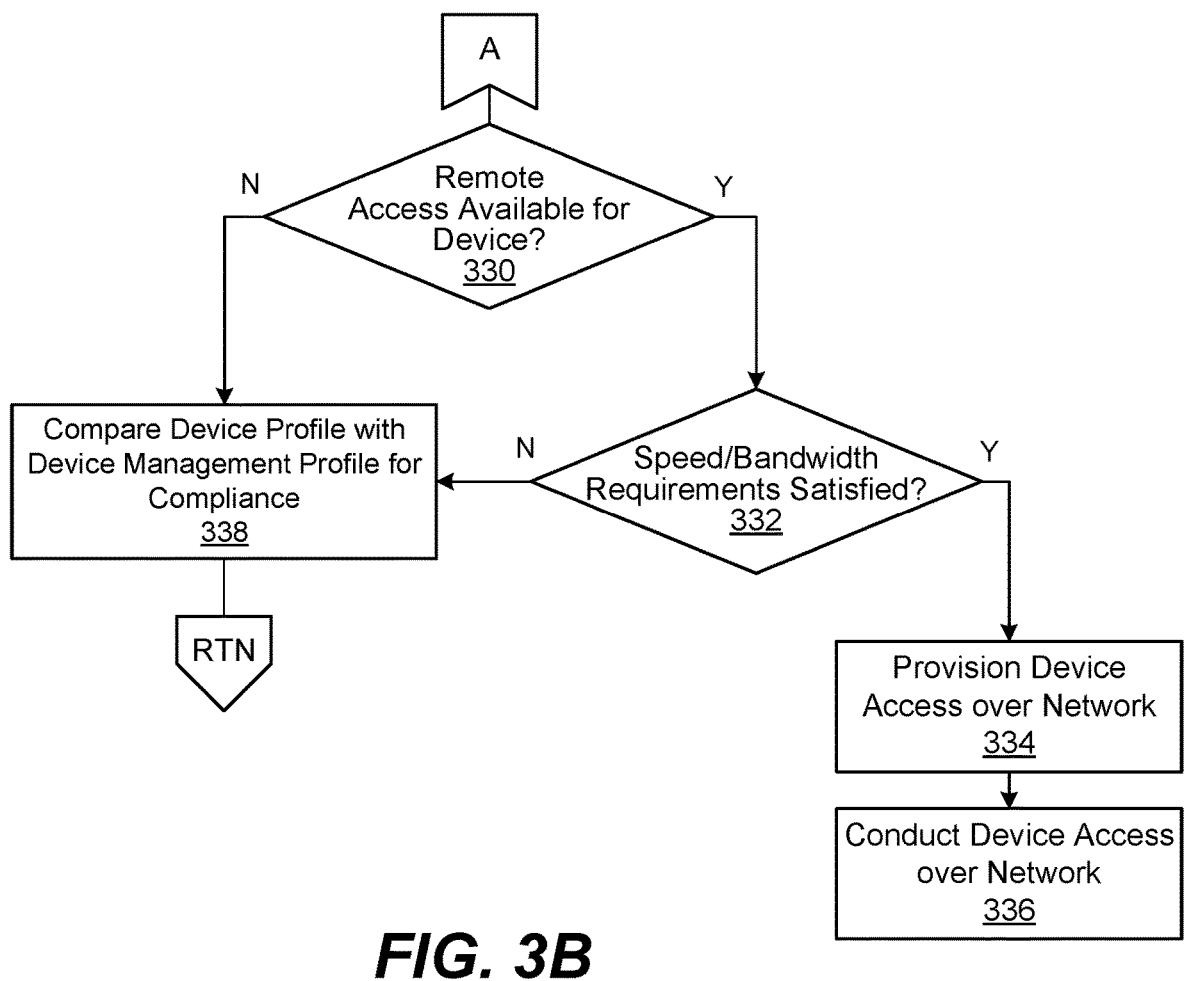
Figure 3C:
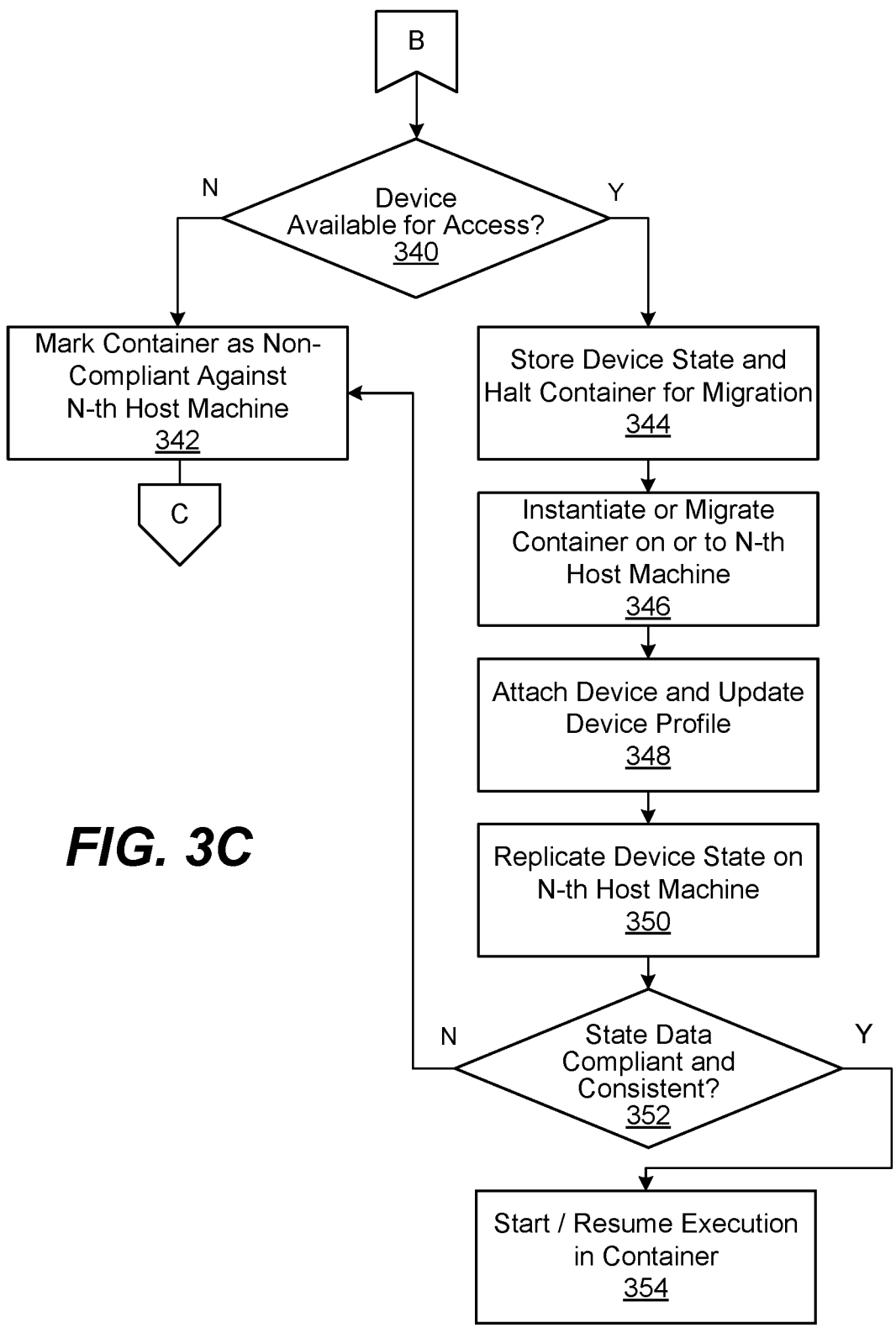

Turning to additional peripheral device access support examples, FIGS. 3A-3C illustrate a process for peripheral device access support for containers according to various examples described herein. The processes is described in connection with the components of the networked environment 10 shown in FIG. 1, although other components in other environments can perform the process. Although the process diagrams show an order of operation or execution, the order can differ from that which is shown. For example, the order of execution of two or more process steps can be switched relative to the order shown or as described below. Also, two or more process steps shown in succession can be executed concurrently or with partial concurrence. Further, in some examples, one or more of the process steps shown in the process diagrams can be skipped or omitted.

At step 302, the process can include determining whether an application executing in an isolation environment, such as a VM or container, has a need, requirement, or requisite for access to a peripheral device. The isolation environment can be new, being instantiated for the first time, or currently hosted on one of the host computing machines 102, 104, or 106. As one example, the access agents 160-163 can identify that the applications executing in the containers 151, 153, 154, and 157 require access to one or more of the peripheral devices 107-109, among others. The access agents 160-163 can determine that the applications require access to the peripheral devices 107-109 in any way, such as based on programmatic calls to device drivers, the examination of program instructions, program metadata, or other ways. If the access agents 160-163 identify a requirement for access to a peripheral device at step 302, then the process can proceed to step 304. Otherwise, if no need or requirement for access is identified, the process can end or return to step 302. In other embodiments, the device resource agent 126 or other processes executing on the computing environment 100 can determine whether an application executing in a container in the cluster 101 has a need, requirement, or requisite for access to a peripheral device at step 302.

At step 304, the process can include determining whether computing resources are limited or constrained in a host computing machine for an isolation environment. For example, the hypervisor 130 can determine that the computing resources of the host computing machine 102 are constrained for the needs of the application in the container 153. Thus, it might be necessary to migrate the container 153 to another host computing machine in the cluster 101. The additional steps shown in FIGS. 3A-C can be processed in that case to facilitate continuity in peripheral device access for the application in the container 153 during the migration. The additional steps shown in FIGS. 3A-3C can also be processed based on other considerations beyond those suggested at steps 302 and 304.

At step 306, the process includes creating one or more device profiles and associating the device profiles with one or more isolation environments, such as VMs or containers. As an example, the access agents 160-163 can create the device profiles 180-183 for the containers 151, 153, 154, and 157, because the applications in those containers require access to one or more of the peripheral devices 107-109. An example device profile is shown in FIG. 2C and discussed above.

At step 308, the process can include identifying peripheral devices on one or more host machines in a distributed computing resource cluster. For example, the device resource agent 126 can review the device catalogue 112 to identify which host machines 102, 104, and 106 the peripheral devices 107-109 are connected to in the cluster 101. In that way, the device resource agent 126 can identify which ones of the host computing machines 102, 104, and 106 can provide device access to the applications in the containers 151, 153, 154, and 157. The device resource agent 126 can also compare the device profiles 180-183 against the device catalogue 112 to identify which ones of the host computing machines 102, 104, and 106 are connected to the peripheral devices 107-109 that the applications in the containers 151, 153, 154, and 157 need access to.

The remaining steps in FIGS. 3A-3C can be performed, in turn or separately, for each of the applications in the containers 151, 153, 154, and 157. The steps are described with reference to the container 151, although the steps can also be performed for one or more of the containers 153, 154, and 157, among others in the cluster 101. At step 310, the process includes determining whether peripheral device access is available on any of the host computing machines 102, 104, and 106 for the device access required by the application in the container 151. As one example, the device resource agent 126 can determine at step 310 that peripheral device access to the "USB 3.0" device is available for the container 151 on the host computing machine 104. In that case, the process can proceed to step 314.

On the other hand, if no host computing machines are available to provide access, then the process can proceed to step 312. At step 312, the agent 160, the PDRM 135, or the device resource agent 126 can mark the device profile 180 of the container 151 as being non-compliant against all the host computing machines 102, 104, and 106 in the cluster 101. In this case, the resource manager 124 might be unable to facilitate the peripheral device access needs of the application in the container 151, and the process can end. The process can also continue to search for and identify any machines in the cluster 101 that happen to provide peripheral device access at a later time by returning to step 308.

At step 314, the process includes identifying the N-th host computing machine in the cluster 101 with access to the peripheral device needed by the container 151. Because more than one of the host computing machines 102, 104, and 106 can be connected to the peripheral device needed by the container 151, the process shown in FIGS. 3A-3C can further evaluate each of the host computing machines 102, 104, and 106, in turn, to determine whether or not any given one is compliant with all the requirements of the device profile 180 of the container 151. To begin, the process can identify the host computing machine 104 for the container 151, because the host computing machine 104 provides peripheral device access to the "USB 3.0" device.

At step 316, the process can include performing a check for compliance of the N-th host machine. For example, the device resource agent 126 can compare the device profile 180 of the container 151 against the device catalogue 112 and the device management profile 114 to determine whether the host machine 104 can provide compliant access to the "USB 3.0" device according to the requirements of the device profile 180. The process of performing the check for compliance at step 316 is illustrated in greater detail in FIG. 3B and described in further detail below.

At step 318, the process can include determining whether the N-th host machine passed the check for compliance at step 316. If the access to the "USB 3.0" device provided by the host computing machine 104 is compliant with the requirements of the device profile 180, for example, then the process can proceed to FIG. 3C, as described in further detail below. Otherwise, if the peripheral device access provided by the N-th host machine is not compliant, then the device resource agent 126 can mark the device profile 180 as being non-compliant against the N-th host machine, and the process can proceed to step 320.

At step 320, the process can determine whether or not other host computing machines capable of providing peripheral device access were identified at step 308. If other host computing machines were identified, then the process increments to the next N-th host computing machine and returns to step 316 to check for compliance of the next machine. If no other host computing machines capable of providing peripheral device access were identified at step 308, then the process proceeds to step 312.

At step 312, the agent 160, the PDRM 135, or the device resource agent 126 can mark the device profile 180 of the container 151 as being non-compliant against all the host computing machines 102, 104, and 106 in the cluster 101, and the process can end. The process can also continue to search for and identify any machines in the cluster 101 that happen to provide peripheral device access at a later time by returning to step 308.

FIG. 3B illustrates various steps in the process of performing a check for compliance, as identified at step 316 in FIG. 3A. Starting at step 330, the process includes the device resource agent 126 determining whether remote access is available for the peripheral device. For example, the device resource agent 126 can review the device profile 180 of the container 151 to determine that it permits remote access for the "Printer" peripheral device but not for the "USB 3.0" peripheral device.

Because remote access is permitted as to the "Printer" peripheral device, the process can proceed to step 332. At step 332, the process can include the device resource agent 126 determining whether or not the speed and bandwidth requirements for access to the "Printer" peripheral device can be met over the network 170. For example, the device resource agent 126 can review the device profile 180 (e.g., FIG. 2C) and compare it with the device catalogue 112 (e.g., FIG. 2A). The device resource agent 126 can identify that the speed requirement specified for the "Printer" in the device profile 180 is within the range defined by the network access speed and available network bandwidth entries in the device catalogue 112 for the "Printer" peripheral device. Because the speed and bandwidth requirements are met in this case, then the process can proceed to step 334. If the requirements are not met at step 332, then the process can proceed to step 338.

At step 334, the process can include provisioning device access over a network. For example, the PDMM 135 and PDMM 136 can provision device access to the "Printer" device for the container 151 over the network 170. The PDMM 135 can start a network access process in the host computing machine 102, and the PDMM 136 can start a network access in the host computing machine 104. The network access processes can enable remote access to the "Printer" among the peripheral devices 108, for example, from the host computing machine 104 to the host computing machine 102. The network access processes can packetize, encapsulate, and otherwise prepare any data for the "Printer" for transfer over the network 170. When the container 151 no longer needs to remotely accessing the peripheral device, then the PDMMs 135 and 136 can terminate the network access processes. The application executing in the container 151 can also be authenticated by the PDMMs 135 and 136, for example, before the network access processes are started in some cases. In other examples, the network access processes can be started and terminated by the agents 160 and 162 or by the device resource agent 126.

At step 336, the process can include conducting peripheral device access over a network. Once device access over the network 170 is provisioned at step 334, the application executing it the container 151 can access one or more of the peripheral devices 108 on the host computing machine 104 based on communications over the network 170.

However, network-based device access may not be suitable for all peripheral devices. For example, the device profile 180 of the container 151 does not permit remote access for the "USB 3.0" peripheral device. In that case, the process could proceed from step 330 to step 338.

At step 338, the process can include the device resource manager 126 comparing the device management profile 114 for compliance with the requirements of the device profile 180 of the container 151. For example, the device resource agent 126 can compare the device profile 180 of the container 151 against the device management profile 114 to determine whether the host machine 104 can provide compliant access to the "USB 3.0" device according to the requirements of the device profile 180. The device profile 180 can specify any suitable requirements for access to any peripheral devices, such as access type, access speed and bandwidth, access frequency and duration, maximum peripheral device percent of time utilized, and other requirements or preferences. The device resource manager 126 can maintain a list of compliant and non-compliant requirements and preferences for reference in later steps.

From step 338 in FIG. 3B, the process can return back to step 318 in FIG. 3A. As noted above, at step 318, the process can include determining whether the N-th host machine passed the check for compliance at step 316. The process flow in FIG. 3B can vary from that shown. For example, the comparing for compliance at step 338 can occur before the determination on remote access availability at step 330. Additionally, the comparing for compliance at step 338 can occur after the speed and bandwidth determination occurs at step 332 and before the provisioning at step 334. Other suitable process flows are also within the scope of the examples described herein.

When the N-th host machine is determined to pass the check for compliance at step 318, the process proceeds from step 318 in FIG. 3A to step 340 in FIG. 3C. At step 340, the process can include determining whether the peripheral device is available for access. Before the container 151 is migrated from the host computing machine 102 to the host computing machine 104 for access to the "USB 3.0" peripheral device, for example, step 340 can be relied upon to confirm that the device is available for use. Step 340 can be moved to different points among the steps shown in FIG. 3C.

If the peripheral device is found to be inaccessible or busy at step 340, then the process can proceed to step 342, where the device resource agent 126 can mark the device profile 180 as being non-compliant against the N-th host machine. The process can then proceed back to step 320 in FIG. 3A. In other cases, the process can simply wait for device availability at step 340 without returning to step 320 in FIG. 3A.

If the peripheral device is found to be accessible at step 340, then the process can proceed to step 344. At step 344, the process can include the agent 160 or the PDMM 135 storing peripheral device state data for any device access processes being conducted by the application in the container 151. For example, peripheral device state data for the container 151 can be stored in the device profile 180. The peripheral device state data can also be forwarded to the device state manager 122 for reference. The peripheral device state data can be stored in the device profile 180 and provided to the device state manager 122 to confirm device state status consistency after migration as described below. Step 340 presumes that some applications are executing and accessing peripheral devices on the cluster 101. However, step 340 can be omitted in some cases, such as when a new container is being instantiated for the first time.

At step 346, the process can include the migration manager 128 instantiating a container on the N-th host computing machine or migrating a container to the N-th host computing machine. In either case, the N-th host computing machine has already been confirmed as being capable of providing the requested or required peripheral device access in the previous steps. The N-th host computing machine has also been confirmed as being compliant with the peripheral device access requirements of the container being instantiated or migrated. As one example, the migration manager 128 can migrate the container 151 from the host computing machine 102 to the host computing machine 104 to provide access to the "USB 3.0" peripheral device as described herein.

At step 348, the process includes one or more of the device resource agent 126, the PDMM 136, and the access agent 162 attaching the peripheral device to the container 151 on the host computing machine 104. For example, the "USB 3.0" peripheral device can be attached to the container 151 for access by the application in the container 151 though the creation of programmatic interfaces, the installation of device drivers, and other processes.

At step 350, the process includes one or more of the device resource agent 126, the PDMM 136, and the access agent 162 replicating the device state on the N-th host machine. For example, any device state data stored for the container 151 at step 344 can now be replicated on the host computing machine 104. The replication of the device state data can place the container 151 in the same or similar state as it was in, with respect to peripheral device access, before the migration at step 346. This can be helpful when a container is migrated from a first host computing machine to a second host computing machine, and the same type peripheral device is accessible at both the first and second host computing machines. On the other hand, step 350 can be omitted in some cases, such as when a new container is being instantiated for the first time and no device state data is being replicated.

At step 352, the process includes one or more of the device resource agent 126, the PDMM 136, and the access agent 162 determining whether the state of the peripheral device is compliant and consistent with the requirements for peripheral device access for the container and with any device state data stored at step 344. Here, a final check is performed to determine if the container that was migrated or instantiated at step 346 is ready to access the peripheral device for which it needed access. If the state data is compliant and the requirements for access are confirmed, then the process can proceed to step 354. Otherwise, the process can proceed to step 342.

At step 354, the process can include starting or resuming execution of the application in the container that was instantiated or migrated at step 346. For example, the processes in the container 151 can be resumed now that the container 151 has access to the "USB 3.0" device on the host computing machine 104.

The flowcharts in FIGS. 3A-3C show examples of the functions and operations of the components described herein. The components described herein can be embodied in hardware, software, or a combination of hardware and software. If embodied in software, each element can represent a module or group of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function (s).

The computing environment 100 and each of the host computing machines 102, 104, and 106 can include at least one processing circuit. Such a processing circuit can include, for example, one or more processors and one or more storage or memory devices coupled to a local interface. The local interface can include, for example, a data bus with an accompanying address/control bus or any other suitable bus structure. Similarly, the client device 190 can include at least one processing circuit. Such a processing circuit can include, for example, one or more processors and one or more storage or memory devices coupled to a local interface.

The storage or memory devices can store data or components that are executable by the processors of the processing circuit. For example, the device profile manager 120, the resource manager 124, and/or other components can be stored in one or more storage devices and be executable by one or more processors in the computing environment 100. Similarly, the access agents 160-163, the PDMMs 135-137, and other components can be stored in one or more storage devices and be executable by one or more processors in the host computing machines 102, 104, and 106.

The device profile manager 120, resource manager 124, access agents 160-163, PDMMs 135-137, and other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more of the components described herein that include software or program instructions can be embodied in any non-transitory computer-readable medium for use by or in connection with an instruction execution system such as, a processor in a computer system or other system. The computer-readable medium can contain, store, and/or maintain the software or program instructions for use by or in connection with the instruction execution system.

A computer-readable medium can include a physical media, such as magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in one computing device or by using multiple computing devices.

Further, any logic or applications described herein, including device profile manager 120, resource manager 124, access agents 160-163, PDMMs 135-137, and other components can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices. Additionally, terms such as "application," "service," "system," "engine," "module," and so on can be used interchangeably and are not intended to be limiting.

The above-described examples of the present disclosure are merely possible examples of implementations set forth for a clear understanding of the principles of the disclosure. Many variations and modifications can be made without departing substantially from the spirit and principles of the disclosure. All such modifications and variations are intended to be included herein within the scope of this disclosure and protected by the following claims.

Therefore, the following is claimed:

1. A method for device access support in a computing environment, comprising:
   identifying a requirement for an isolation environment to have access to a peripheral device;
   creating a device profile for the isolation environment and associating the device profile with the isolation environment;
   identifying the peripheral device on a host machine in a distributed computing resource cluster;
   performing a check for compliance of the peripheral device on the host machine for the isolation environment based on the device profile by comparing the device profile of the isolation environment against a device catalogue of the host machine to determine whether the host machine can provide compliant access to a device identified by the device profile according to requirements of the device profile; and
   instantiating the isolation environment on the host machine based on the check for compliance.

2. The method according to claim 1, wherein the isolation environment comprises a container environment.

3. The method according to claim 1, wherein performing the check for compliance of the peripheral device comprises comparing the device profile for the isolation environment with a device management profile for the distributed computing resource cluster.

4. The method according to claim 1, wherein the device profile comprises at least one of: a peripheral device identifier, a remote access permission, an access frequency, an access duration, or peripheral device state data.

5. The method according to claim 1, wherein:
   before instantiating the isolation environment, an application is executing in the isolation environment on a first host machine in the distributed computing resource cluster;
   identifying the peripheral device comprises identifying the peripheral device on a second host machine in the distributed computing resource cluster; and
   instantiating the isolation environment comprises migrating the isolation environment from the first host machine to the second host machine based on the check for compliance.

6. The method according to claim 5, wherein:
   the isolation environment comprises a container in a virtual machine; and
   migrating the isolation environment comprises migrating the virtual machine from the first host machine to the second host machine.

7. The method according to claim 6, wherein migrating the isolation environment comprises:
   determining that the peripheral device is available for access on the second host machine;
   storing a device state for the peripheral device;
   halting execution of the application in the isolation environment;
   migrating the isolation environment from the first host machine to the second host machine; and
   replicating the device state for the peripheral device on the second host machine.

8. The method according to claim 7, wherein migrating the isolation environment further comprises:
   checking the device state on the second host machine for consistency with the device state on the first host machine; and
   resuming execution of the application or marking the isolation environment as non-compliant based on the checking.

9. A non-transitory computer-readable medium embodying program code for device access support in a computing environment that, when executed by at least one computing device, directs the at least one computing device to at least:
   identify a requirement for an isolation environment to have access to a peripheral device;
   create a device profile for the isolation environment and associating the device profile with the isolation environment;
   identify the peripheral device on a host machine in a distributed computing resource cluster;
   perform a check for compliance of the peripheral device on the host machine for the isolation environment based on the device profile by comparing the device profile of the isolation environment against a device catalogue of the host machine to determine whether the host machine can provide compliant access to a device identified by the device profile according to requirements of the device profile; and
   instantiate the isolation environment on the host machine based on the check for compliance.

10. The non-transitory computer-readable medium according to claim 9, wherein the isolation environment comprises a container environment.

11. The non-transitory computer-readable medium according to claim 9, wherein, to perform the check for compliance, the at least one computing device is directed to at least compare the device profile for the isolation environment with a device management profile for the distributed computing resource cluster.

12. The non-transitory computer-readable medium according to claim 9, wherein the device profile comprises at least one of: a peripheral device identifier, a remote access permission, an access frequency, an access duration, or peripheral device state data.

13. The non-transitory computer-readable medium according to claim 9, wherein:
   before the isolation environment is instantiated, an application is executing in the isolation environment on a first host machine in the distributed computing resource cluster; and
   the at least one computing device is further directed to:

identify the peripheral device on a second host machine in the distributed computing resource cluster; and migrate the isolation environment from the first host machine to the second host machine based on the check for compliance.

14. The non-transitory computer-readable medium according to claim 13, wherein:

the isolation environment comprises a container in a virtual machine; and the at least one computing device is directed to migrate the virtual machine from the first host machine to the second host machine.

15. The non-transitory computer-readable medium according to claim 13, wherein, to migrate the isolation environment, the at least one computing device is directed to:

determine that the peripheral device is available for access on the second host machine;

store a device state for the peripheral device;

halt execution of the application in the isolation environment;

migrate the isolation environment from the first host machine to the second host machine;

and replicate the device state for the peripheral device on the second host machine.

16. At least one computing device for device access support in a computing environment, comprising:

a memory device configured to store computer-readable instructions thereon; and at least one processing device configured, through execution of the computer-readable instructions, to direct the at least one computing device to at least:

identify a requirement for an isolation environment to have access to a peripheral device;

create a device profile for the isolation environment and associating the device profile with the isolation environment;

identify the peripheral device on a host machine in a distributed computing resource cluster;

perform a check for compliance of the peripheral device on the host machine for the isolation environment based on the device profile by comparing the device profile of the isolation environment against a device catalogue of the host machine to determine whether the host machine can provide compliant access to a device identified by the device profile according to requirements of the device profile; and instantiate the isolation environment on the host machine based on the check for compliance.

17. The at least one computing device according to claim 16, wherein the isolation environment comprises a container environment.

18. The at least one computing device according to claim 16, wherein, to perform the check for compliance, the at least one computing device is directed to at least compare the device profile for the isolation environment with a device management profile for the distributed computing resource cluster.

19. The at least one computing device according to claim 16, wherein the device profile comprises at least one of: a peripheral device identifier; a remote access permission, an access frequency, an access duration, or peripheral device state data.

20. The at least one computing device according to claim 16, wherein;

before the isolation environment is instantiated, an application is executing in the isolation environment on a first host machine in the distributed computing resource cluster; and the at least one computing device is further directed to:

identify the peripheral device on a second host machine in the distributed computing resource cluster; and migrate the isolation environment from the first host machine to the second host machine based on the check for compliance.

* * * * *